(12) United States Patent
Croxford et al.

(10) Patent No.: US 11,670,157 B2
(45) Date of Patent: Jun. 6, 2023

(54) AUGMENTED REALITY SYSTEM

(71) Applicant: Arm Limited, Cambridge (GB)

(72) Inventors: Daren Croxford, Swaffham Prior (GB); Sean Tristram Leguay Ellis, Farnham (GB); Laura Johanna Lähteenmäki, Cambridge (GB)

(73) Assignee: Arm Limited, Cambridge (GB)

( * ) Notice: Subject to any disclaimer, the term of this patent is extended or adjusted under 35 U.S.C. 154(b) by 142 days.

(21) Appl. No.: 17/339,710

(22) Filed: Jun. 4, 2021

(65) Prior Publication Data

US 2021/0383673 A1 Dec. 9, 2021

(30) Foreign Application Priority Data

Jun. 8, 2020 (GB) .................................... 2008607

(51) Int. Cl.
*G08B 21/24* (2006.01)
*G06T 7/70* (2017.01)
*G06T 19/00* (2011.01)
*G08B 13/196* (2006.01)

(52) U.S. Cl.
CPC ................ *G08B 21/24* (2013.01); *G06T 7/70* (2017.01); *G06T 19/006* (2013.01); *G08B 13/19613* (2013.01); *G06T 2200/24* (2013.01)

(58) Field of Classification Search
None
See application file for complete search history.

(56) References Cited

U.S. PATENT DOCUMENTS

| 2013/0253824 | A1* | 9/2013 | Yang .................... G01C 21/206 |
| | | | 701/522 |
| 2018/0045963 | A1* | 2/2018 | Hoover ................... G06F 3/013 |
| 2019/0392729 | A1 | 12/2019 | Lee et al. |
| 2021/0327251 | A1* | 10/2021 | Wu ..................... G08B 21/0247 |

FOREIGN PATENT DOCUMENTS

| WO | 2004100093 A2 | 11/2004 |
| WO | 2014025696 A2 | 2/2014 |
| WO | 2020214864 A1 | 10/2020 |

OTHER PUBLICATIONS

United Kingdom Combined Search and Examination Report dated Dec. 9, 2020 for GB Application No. GB 2008607.0.
United Kingdom Examination Report dated Jan. 31, 2023 for GB Application No. GB2008607.0.

\* cited by examiner

*Primary Examiner* — Thomas S McCormack
(74) *Attorney, Agent, or Firm* — EIP US LLP (57) ABSTRACT

An AR system includes a user interface, one or more sensors arranged to generate sensor data representing part of an environment in which a user of the AR system is located, and a memory. The memory is arranged to store object association data associating the user with one or more objects in the environment, and object location data indicating a respective location of each of the one or more objects. The AR system is arranged to determine a position of the user; determine an updated location of one of the one or more objects in dependence on the generated sensor data and the determined position of the user, update the stored object location data to indicate the determined updated location of said one of the one or more objects, and output information depending on the updated location of said one of the one or more objects via the user interface.

18 Claims, 8 Drawing Sheets

AUGMENTED REALITY SYSTEM

CROSS-REFERENCE TO RELATED APPLICATIONS

This application claims the benefit under 35 U.S.C. § 119(a) and 37 CFR § 1.55 to United Kingdom patent application no. GB 2008607.0 filed on Jun. 8, 2020, the entire content of which is incorporated herein by reference.

BACKGROUND OF THE INVENTION

Field of the Invention

The present disclosure relates to augmented reality (AR) systems. The disclosure has particular, but not exclusive, relevance to the use of an AR system to keep track of a user's possessions.

Description of the Related Technology

Losing possessions, for example due to leaving possessions behind when leaving a public place, can cause serious inconvenience and can potentially be costly if the possession cannot be found or recovered. The problem can be particularly prevalent for people who have issues with their memory, for example resulting from dementia, and/or for small possessions whose absence may not readily be noticed. It is common, for example, for a person to leave his or her home with a smartphone, pair of headphones, set of keys, wallet and/or purse.

Augmented reality (AR) devices such as AR headsets, which provide visual information to enhance a user's experience of an environment, are becoming smaller, lighter, and with form factors allowing for prolonged and/or everyday use.

SUMMARY

According to a first aspect, there is provided an augmented reality (AR) system. The AR system includes a user interface, one or more sensors arranged to generate sensor data representing part of an environment in which a user of the AR system is located, and a memory. The memory is arranged to store object association data associating the user with one or more objects in the environment, and object location data indicating a respective location of each of the one or more objects. The AR system is arranged to determine a position of the user, determine an updated location of one of the one or more objects in dependence on the generated sensor data and the determined position of the user, update the stored object location data to indicate the determined updated location of said one of the one or more objects, and output information depending on the updated location of said one of the one or more objects via the user interface.

According to a second aspect, there is provided a computer-implemented method. The method includes storing object association data associating one or more objects in an environment with a user of an AR system, receiving sensor data representing part of the environment in which the user is located, determining a position of the user, determining a location of one of the one or more objects associated with the user in dependence on the received sensor data and the determined position of the user, storing object location data indicating the determined location of said one of the one or more objects, and outputting information depending on the determined location of said one of the one or more objects via a user interface of the AR system.

Further features and advantages will become apparent from the following description of preferred embodiments, given by way of example only, which is made with reference to the accompanying drawings.

DETAILED DESCRIPTION

Figure 1:
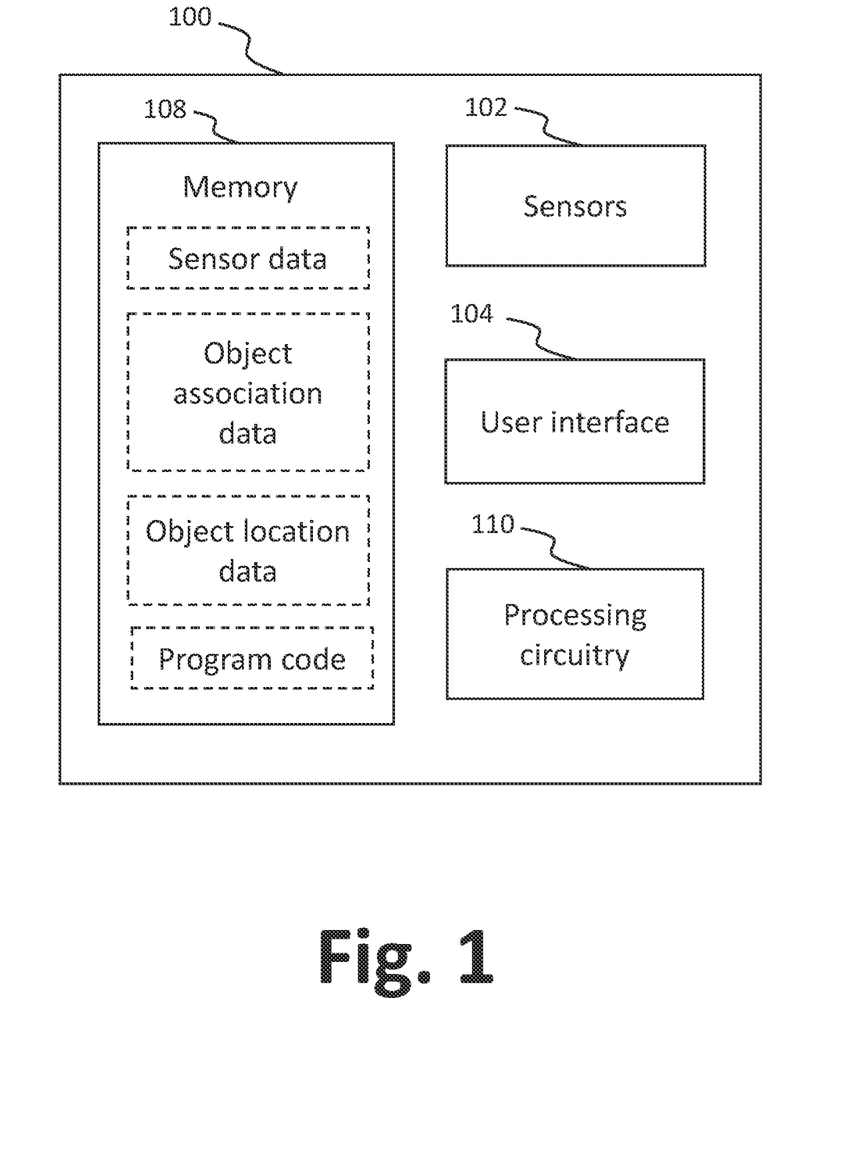
FIG. 1 is a schematic block diagram showing an augmented reality (AR) system in accordance with examples.

FIG. 1 shows an example of an AR system 100. The AR system 100 can be embodied as a single AR device, for example a headset, a pair of smart glasses, or any other type of suitable wearable device. The AR system 100 can alternatively include multiple devices connected by wired or wireless means. A specific embodiment will be described in more detail with reference to FIG. 2.

The AR system 100 includes one or more sensors 102 arranged to generate sensor data representing part of an environment in which a user of the AR system 100 is located. The sensors 102 may be components of a single device such as an AR headset, or alternatively may be components of multiple connected devices. The sensors 102 include one or more cameras for generating image data representing part of the environment falling within a field of view of the one or more cameras. The field of view may be delimited in the vertical and/or horizontal directions, depending on the number and location of the cameras. For example, the cameras may be arranged to face in substantially the same direction as the head of a user wearing an AR headset, in which case the field of view of the one or more cameras may include a whole or part of the user's field of vision. Alternatively, the field of view may include a wider region, for example completely surrounding the user. The cameras may include stereo cameras from which the AR system can derive, using stereo matching, depth information indicating distances to objects in the environment. The sensors 102 may alternatively, or additionally, include depth sensors for generating depth information, for example an infrared camera, a sound navigation ranging (sonar) transceiver, and/or a light detection and ranging (LIDAR) system. The AR system 100 may be configured to combine image data and associated depth information to generate a three-dimensional representation of part of the environment, for example in RGB-D format, and/or as a point cloud or volumetric representation.

The sensors 102 include position sensors for determining a location and/or orientation (referred to collectively as a position or pose) of the user of the AR system 100. The position sensors may include a global positioning system (GPS) module, one or more accelerometers, and/or a Hall effect magnetometer for determining orientation (an electronic compass). The AR system 100 may additionally or alternatively be capable of determining or refining an estimated position of the user by analysing image data and/or depth information using simultaneous location and mapping (SLAM) techniques.

The AR system 100 includes a user interface 104 via which the user can interact with the AR system 100. The user interface 104 includes input devices and output devices, which may be components of a single AR device, or alternatively may be components of multiple connected devices. The output devices are arranged to output information for the user, and include one or more displays for providing visual information to the user to enhance the user's experience of the environment. The one or more displays may include an opaque display arranged to generate and display image data corresponding to a representation of part of the environment generated using the one or more cameras and/or depth sensors, with additional information or virtual objects overlaid or otherwise combined with the generated representation of the environment. Additionally, or alternatively, the one or more displays may include a transparent display through which the user can directly observe the environment, and on which information or virtual objects are projected, for example using waveguiding or laser scanning display technology.

The output devices may include one or more loudspeakers, for example mounted in an earpiece or headphones, allowing the AR system 100 to output information to the user in the form of audio. The audio may include, for example, synthesised or pre-recorded speech, bleeps, buzzes, clicks, music, or any other sound suitable for conveying information to the user.

The output devices may further include haptic output devices arranged to generate forces to cause motion of part or all of the AR system 100, including for example vibrations, clicks, or other movements that can be detected by the user's sense of touch. In an example, an AR headset may send a signal to a further device such as a smart watch, fitness tracker, bracelet or other wearable device, or a smartphone, causing the further device to provide a haptic output for the user.

The input devices of the user interface 104 are arranged to receive information from the user of the AR system 100. The input devices may include one or more microphones for capturing speech or other sounds made by the user. For example, the input devices may include a microphone array from which the AR system 100 can determine a direction to an audio source, allowing the AR system 100 to distinguish sounds made by the user from other sounds in the environment. The AR system 100 may further be arranged to perform speech recognition and to react to spoken instructions from the user.

The input devices may include one or more eye tracking sensors arranged to track orientations and/or motion of the user's eyes. An eye tracking sensor may, for example, be an optical eye tracking sensor capable of tracking an orientation of an eye by analysing images of the eye generated by an eye-facing camera. An eye tracking sensor may generate eye tracking data from which the AR system 100 can determine which part of the environment, or which object in the environment, the user is currently looking at. An eye tracking sensor may further be used to determine when a user blinks or closes his or her eyes, which the AR system 100 can use as an input signal.

The input devices may further include buttons or touch input devices. For example, the AR system 100 may include one or more scroll-wheels, touch-sensitive regions or trackpads. As mentioned above, the input devices may be part of an AR device housing the sensors 102 or may be part of a separate remote device.

In some examples, the one or more cameras of the AR system 100 may further function as user input devices, for example to facilitate gesture recognition. Furthermore, the accelerometers and/or electronic compass may be used to determine when a user nods or shakes his or her head.

The AR system 100 includes a memory 108 and processing circuitry 110. The memory 108 and the processing circuitry 110 may be part of an AR device housing the sensors 102. Alternatively, some of the memory 108 and the processing circuitry 110 may be part of one or more separate devices, for example a dedicated computing device, a smartphone, a tablet or laptop computer, a desktop computer, a server, or one or more devices in a networked system. In examples, certain data storage and processing tasks take place locally at an AR device, whilst other data storage and processing tasks take place remotely. In this way, the data storage and processing performed by the AR device can be kept to a necessary minimum, allowing the AR device to have a size, weight and form factor that are practical and attractive for prolonged use and/or everyday use of the AR device.

The memory circuitry 108 includes non-volatile storage, for example in the form of one or more solid-state drives (SSDs), along with non-volatile and volatile random-access memory (RAM), for example static random-access memory (SRAM) and dynamic random-access memory (DRAM). Other types of memory can be included, such as removable storage, synchronous DRAM, and so on.

The processing circuitry 110 may include various processing units including a central processing unit (CPU), a graphics processing unit (GPU) and/or a specialist neural processing unit (NPU) for efficiently performing neural network operations. For the present disclosure, neural networks may be used for certain tasks including object detection and SLAM, as will be described in more detail hereafter. The processing circuitry 110 may include other specialist processing units, such as application specific integrated circuits (ASICs), digital signal processors (DSPs), or field programmable gate arrays (FPGAs).

The memory 108 holds machine-readable instructions in the form of program code which, when executed by the processing circuitry 110, cause the AR system 100 to perform methods as described hereinafter. The memory 108 is also arranged to store further data for use in performing said methods. The further data in this example includes sensor data generated by the one or more sensors 102, object association data associating a user of the AR system 100 with one or more physical objects in the environment, and object location data indicating a respective location of each of the one or more objects.

Figure 2:
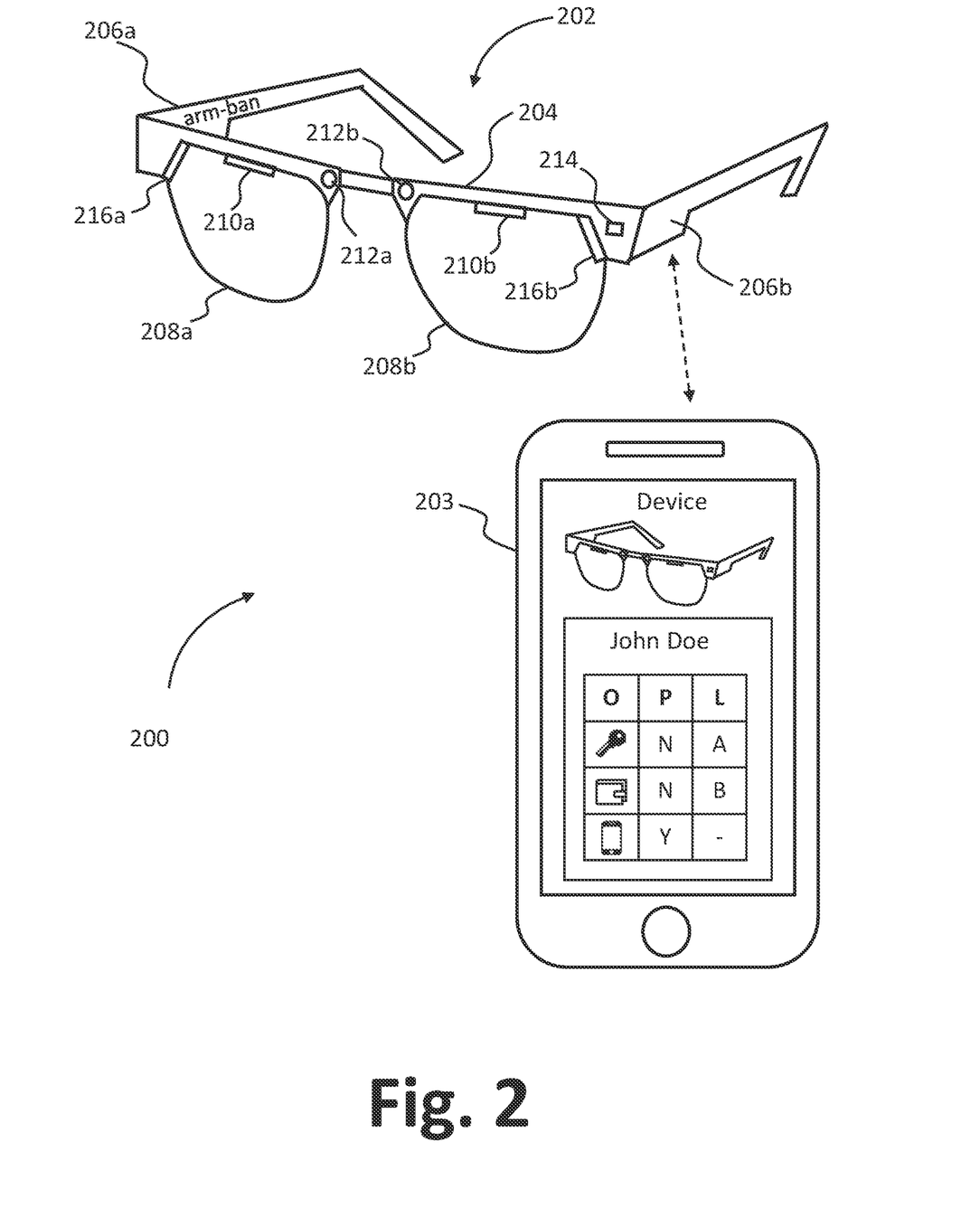
FIG. 2 shows an example of an AR system comprising a pair of smart glasses.

FIG. 2 shows an example of an AR system 200 comprising a pair of smart glasses 202 and an associated app on a smartphone 203. In this example, the smart glasses 202 and the smartphone 203 are paired during a pairing process, though in other examples the smart glasses 202 could be paired with another type of device such as a smart watch or tablet computer, or alternatively may function without being paired with any further device.

The smart glasses 202 include a central frame portion 204 and two folding arms 206a, 206b, where the central portion 204 acts as a support for two lenses 208a, 208b. The central frame portion 204 and the arms 206a, 206b house various sensors and user interface components, as will be described hereafter. The lenses 208a, 208b in this example are neutral, though in other examples the lenses could be corrective lenses matching a prescription of a specific user, and/or could be tinted, for example in the case of smart sunglasses. Each of the lenses 208a, 208b is a transparent display on which a corresponding projection component 210a, 210b is arranged to display information for the user.

The central frame portion 204 houses two front-facing cameras 212a, 212b with a combined field of view approximately corresponding to that of the user. The AR system 200 is arranged to analyse image data generated by the cameras 212a, 212b using stereo matching to determine depth information. The central frame portion 204 further houses a microphone array 214 for receiving vocal input from the user, and optical eye tracking sensors 216a, 216b for tracking orientations and motion of the user's right and left eye respectively. The arms 206a, 206b house a dedicated power supply, processing circuitry and memory circuitry, as well as a global positioning system (GPS) receiver, an electronic compass, accelerometers, and a communication module including an antenna for communicating wirelessly with the smartphone 203 running the associated app. It is noted that, whilst the smart glasses 202 in this example include the necessary components for the smart glasses 202 to function independently of the smartphone 203, the smartphone 203 also includes certain equivalent components to those of the smart glasses 202, for example a GPS receiver and accelerometers. Where appropriate, the AR system 200 can make use of the components of the smartphone 203 instead of the equivalent components of the smart glasses 202, for example to save battery power of the smart glasses 202.

The AR system 200 is arranged to determine a position (i.e. location and orientation) of the user using the onboard GPS receiver and the electronic compass of the smart glasses 202, and/or by processing image data from the cameras 212a, 212b using SLAM. The AR system 200 may be configured to continually monitor the position of the user, or alternatively to determine the position of the user only when certain events are detected (for example, when movement of the user is detected by the accelerometers).

The smart glasses 202 can be configured in accordance with preferences of the user, for example using the app on the smartphone 203 or directly using input devices of the smart glasses 202. For example, the user can use the app to select the type of information that is displayed on the lenses 208a, 208b, and whether the smart glasses 202 continually monitor the location of the user as mentioned above. The app has associated storage on the smartphone 203, which may be used in addition to the memory circuitry of the smart glasses 202 to store data for use by the AR system 200. The AR system 200 can further utilise processing capabilities of the smartphone 203 to perform certain resource-intensive processing tasks, such as SLAM. Sharing the storage and processing requirements of the AR system 200 between the smart glasses 202 and the smartphone 203 allow for the size, weight and form factor of the smart glasses 202 to be similar to a regular pair of glasses, such that a user can comfortably wear the smart glasses 202 for prolonged periods of times, and on an everyday basis.

Figure 3:
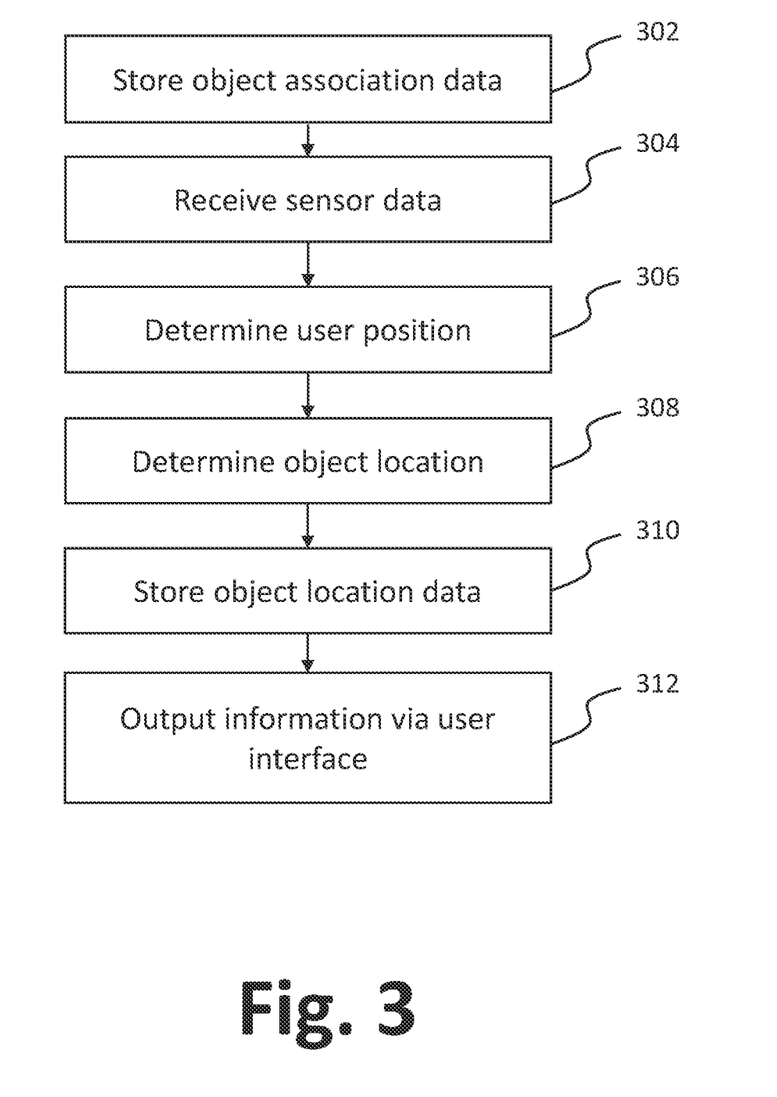
FIG. 3 is a flow diagram showing a computer-implemented method of generating information for outputting via a user interface of an AR system in accordance with examples.

FIG. 3 shows an example of a method performed by the AR system 200 in accordance with the present disclosure. It will be appreciated that, whilst the method is described with reference to the AR system 200, the same method can be performed by any suitable embodiment of the AR system 100, without departing from the scope of the disclosure.

The AR system 200 stores, at 302, object association data associated a user of the AR system 200 with one or more objects in an environment. The AR system 200 may store association data for multiple users. In this example, the app on the smartphone 203 can be used to view the object association data. The AR system 200 stores object association data for a user John Doe, indicating that John Doe is associated with three objects—a set of keys, a wallet, and the smartphone 203. In this example, the app shows a table under the name of the user, with rows corresponding to the different objects associated with the user. The column entitled "O" includes an icon representing the object. The column entitled "P" indicates whether the user is currently in possession of the object. The column entitled "L" indicates a location of the object. A method for generating, storing, and updating the object association data is described with reference to FIG. 8.

The AR system 200 receives, at 304, sensor data representing part of an environment in which the user of the AR system 200 is located. In this example, the sensor data includes image data generated by the front-facing cameras 212a, 212b. The cameras 212a, 212b are arranged to continually generate frames of image data for analysis by the AR system 200. The frames of image data are generated at a rate sufficiently high to capture events occurring in the environment, but sufficiently low that the AR system 200 can analyse the image data in real time. In other examples, sensor data may include other types of data, for example depth information.

The AR system 200 determines, at 306, a position of the user of the AR system 200. Depending on the information available to the AR system 200, the determined position may be a global position, or may be a local position relative to a local co-ordinate system within a room or other vicinity in which the user is located. In this example, the AR system 200 is arranged to determine a location and orientation of the user using the onboard GPS receiver, accelerometers and/or electronic compass of the smart glasses 202, and/or by processing image data from the cameras 212a, 212b. For example, the AR system 200 may determine an approximate location and orientation of the user using the GPS receiver and electronic compass, then use SLAM to determine a refined location and orientation if the user is in a suitable location (for example, if the user is indoors). Alternatively, if the AR system 200 is unable to determine a global location of the user using the GPS receiver, the AR system 200 may determine a local position using SLAM. Additionally, or alternatively, the AR system 200 may determine a location of the user using computer vision techniques such as scene recognition. For example, the AR system 200 may determine, using scene recognition, that the user is in a pub or restaurant, or in the user's home.

The AR system 200 determines, at 308, a location of one of the objects indicated as being associated with the user, in dependence on the sensor data received at 306 and the position of the user determined at 308. In this example, the AR system 200 processes the image data generated by the cameras 212a, 212b using object detection. Upon detecting one of the objects associated with the user, the AR system 200 determines a location of the detected object relative to the user. In this example, the location of the detected object relative to the user is determined in three dimensions using depth information derived using stereo matching. The AR system 200 then determines the location of the object in dependence on the determined position of the user. The location of the object can be a global position, a local position with respect to a local co-ordinate system, or a combination of both. For example, if the position of the user determined at 306 is a global position, then the AR system 200 can determine a global location of the object. If the position of the user determined at 306 is a local position, then the AR system 200 can determine a local location of the object.

In addition to determining the location of the detected object, the AR system 200 determines whether the user is currently in possession of the detected object, for example currently holding the object, carrying the object in a pocket, or wearing the object in a case where the object is an item of clothing. For this purpose, the AR system 200 is arranged to recognise when an object is picked up or put down by the user. Because the cameras 212a, 212b are front-facing, with a field of view roughly equating to that of the user, it is very likely that when a user picks up or puts down an object, the object will be in the field of view of the cameras 212a, 212b. In the present example, in order to recognise when an object is picked up or put down, a machine learning classifier based on a convolutional neural network is trained to identify when the user is holding an object in his or her hand. If, in a sequence of images captured by the cameras 212a, 212b, the object is determined to remain in the hand of the user whilst leaving the field of view of the cameras 212a, 212b, the AR system 200 will determine that the object has been picked up by the user, and that the user is therefore in possession of the object. By contrast, if, in a sequence of images, an object is first determined to be in the hand of the user and is subsequently determined not to be in the hand of the user but still in the field of view, the AR system 200 can determine that the object has been put down or placed within the environment, and that the user is therefore no longer in possession of the object. It will be appreciated that other methods may be employed for recognising when a user picks up or puts down an object. More generally, if the AR system 200 detects an object in the environment and the object is not held by the user, the AR system 200 will determine that the user is not currently in possession of the detected object. The AR system 200 stores, at 310, object location data indicating the determined location of the object. The object location data may for example include precise global or local co-ordinates of the determined location of the given object, including latitude, longitude and altitude. Other representations are possible without departing from the scope of the disclosure. For example, it has been shown that if the surface of the earth is dividing into a grid of three-metre squares, every one of the three-metre squares can be identified uniquely using a permutation of three words of the English language.

In addition to the coordinate representation of the determined location of the object, the AR system 200 may determine a name or other identifier such as a zip code or post code of the updated location, for example by interfacing with local or cloud-based mapping software and/or by recognising a location designated by the user such as "home", "work" etc. By using the determined position of the user and by analysing the image data received from the cameras 212a, 212b, the AR system 200 may be able to determine a very specific identifier for the location of the object, for example "on your desk at work" or "on the bar at The Eagle pub". In the present example, the object location data further indicates whether the user is currently in possession of the object.

In a further example, an AR system may store object location data in a hierarchical manner. For example, the AR system may recognise when a first object is placed within a second object such as a bag, and thus form an association between the locations of the first and second objects. The object location data will then indicate that the location of the first object is identical to the location of the second object, until the AR system 200 determines that the locations of the two objects are no longer associated. Similarly, object location data may indicate that a first object such as a credit card is located within a second object such as a purse, which is located within a third object such as a handbag. The AR system 200 will form an association between the locations of the three objects such that the object location data indicates that the locations of all three are identical to the location of the handbag, until the AR system 200 determines that the locations of the three objects are no longer associated.

The AR system 200 outputs, at 312, information depending on the stored object location data. The information may, for example, be indicative of a location most recently determined for one of the objects associated with the user. In an example, the AR system 200 outputs the information in response to a request from the user. The request may include a verbal request received via the microphone array 214, in which case the AR system 200 can identify the request and/or determine the content of the request using voice recognition and natural language processing. The verbal request may, for example, include the user asking "where are my keys?". The request may additionally or alternatively include a gesture, in which case the AR system 200 can identify the request by analysing image data received from the cameras 212a, 212b. A request may be received via any other suitable input method.

Figure 4A:
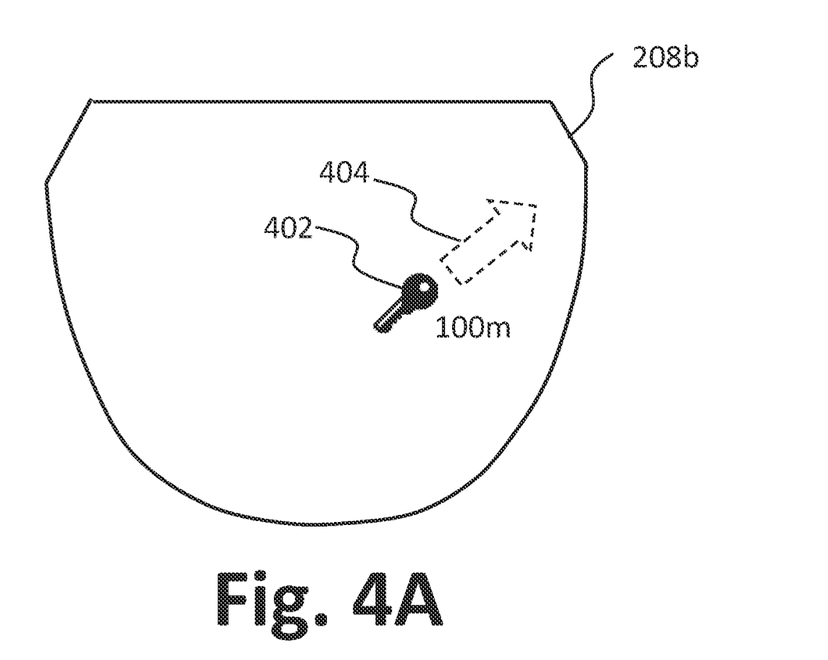
FIGS. 4A and 4B show an example of information being output by the AR system of FIG. 2.
Figure 4B:
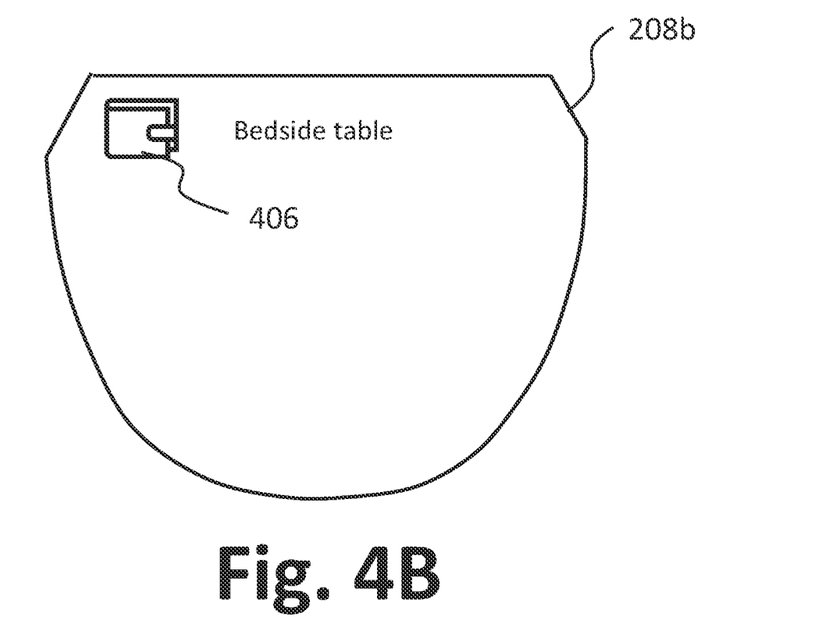

The AR system 200 may output the information to the user via any user interface of the AR system 200, for example by displaying the information on the lenses 208a, 208b of the smart glasses 202. FIG. 4A shows an example in which information is displayed indicative of a location of an object associated with the user. The displayed information includes an icon 402 representing the object (a set of keys), an arrow 404 representing a direction to a location most recently determined for the object, and text indicating a distance to the location most recently determined for the object. FIG. 4B shows another example in which information is displayed indicative of a location of an object associated with the user. The displayed information includes an icon 406 representing the object (a wallet), and a text description of a location most recently determined for the object. In a further example, the information could include an image captured by the cameras 212a, 212b, showing where the AR system 200 last detected the object.

As an alternative to displaying information on the lenses 208a, 208b, the AR system 200 can output the information via the app on the smartphone 203. In the example of FIG. 2, the app displays a table indicating object location data for several objects associated with the user. The column entitled "P" indicates whether the user John Doe is currently in possession of each object ("Y" indicates that the user is currently in possession of the object, "N" indicates that the user is not currently in possession of the object). In this case, John Doe is not currently in possession of the set of keys or the wallet, but is currently in possession of the smartphone 203. The column entitled "L" indicates a location of each of the objects. In this example, the table does not display a location for the smartphone 203, because it has been determined that John Doe is currently in possession of the smartphone 203.

In the examples described above, information is displayed visually for the user of the AR system 200. In other examples, information can be conveyed to the user via any other suitable method, for example as audio including synthesised or pre-recorded speech.

Figure 5:
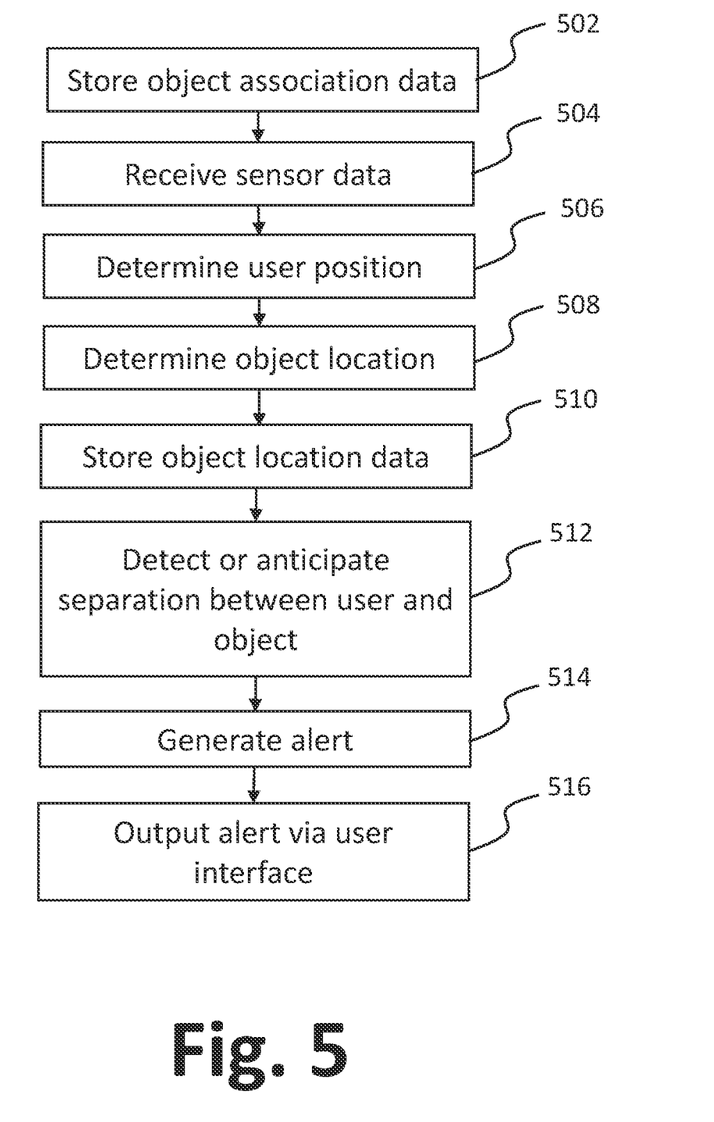
FIG. 5 is a flow diagram showing a computer-implemented method of generating an alert for outputting via a user interface of an AR system in accordance with examples.

FIG. 5 shows a further method performed by the AR system 200 (or any other suitable embodiment of the AR system 100). The operations 502-510 of FIG. 5 are identical to the operations 302-310 of FIG. 3. At 512, the AR system 200 detects or anticipates a separation of the user from one of the objects associated with the user. Such a separation may be detected, for example, if the object is in the field of view of the cameras 218a, 218b, and either the object or the user move such that the object is no longer in the field of view. A separation may be anticipated, for example, if an angular separation of the object from an axis of the cameras 212a, 212b exceeds a predetermined threshold, indicating that the user has turned away from the object.

The AR system 200 may anticipate a separation of an object from the user if the user puts down the object in a particular location. For example, the AR system 200 may anticipate a separation of a set of keys from the user if the AR system 200 detects the user placing the set a keys on a surface in a public place. The AR system 200 may further use the eye tracking sensors 216a, 216b to determine whether the user is looking directly at the object whilst placing the object down. If the user is not looking directly at the object, the AR system 200 may determine that the user is not concentrating on the object, and accordingly anticipate a separation of the object from the user.

The AR system 200 may further anticipate or detect a separation of an object from the user when the object is outside the field of view of the cameras 212a, 212b. For example, the AR system 200 may detect, from the position of the user determined at 506, that the user is moving away from the object, and accordingly detect a separation between the user and the object. A separation between the user and the object may be detected, for example, if a distance between the user and the object is determined to increase beyond a predetermined threshold. Alternatively, the AR system 200 may determine that the user is leaving a premises where an object is located, without being in possession of the object, and thereby detect a separation between the user and the object. For example, the AR system 200 may recognise the user placing a set of keys on a table in a restaurant, and store object location data indicating the location of the keys. At a later time, the AR system 200 may determine that the user is leaving the restaurant, whilst not being in possession of the set of keys, and thereby detect a separation between the user and the set of keys.

A separation may also be detected or anticipated if the AR system 200 determines that the object has moved whilst in the field of view of the cameras 212a, 212b. An object could move, for example, if a person other than the user has picked up the object (which may indicate that the object is being stolen), or if an object falls off a surface. The AR system 200 may also be able to detect a location or motion of an object whilst the object is not in view of the cameras 212a, 212b. For example, the AR system 200 may detect motion of a connected device, such as the smartphone 203, based on a wireless signal transmitted by the connected device, such as a Bluetooth signal or a Wi-Fi signal.

The AR system 200 generates, at 514, an alert in dependence on the detected or anticipated separation of the object from the user, and outputs, at 516, the alert via the user interface. In this example, the alert is a visual alert projected on the lenses 208a, 208b of the smart glasses 202. In other examples, an alert may alternatively or additionally have an audio component such as pre-recorded or synthesised speech, or any other sound. The alert may identify the object, and/or may include information indicative of the location of the object indicated by the object location data. In some examples, different levels of alert may be generated in dependence on different events. For example, the AR system 200 may generate a first alert upon anticipating a separation of the user from an object in response to the user turning away from the object so that the object is no longer in the field of view of the cameras 212a, 212b. The AR system 200 may subsequently generate a second alert upon detecting a separation of the user from the object, for example if the user moves away from the object or if the user leaves a premises where the object is located. Whilst the first alert may be a relatively unobtrusive visual alert, for example an arrow displayed at a periphery of the lenses 208a, 208b, the second alert may be more intrusive, for example displayed centrally on the lenses 208a, 208b, and/or including an audio component. The AR system 200 may generate a high priority alert, for example including an audio component, if the AR system 200 detects the object being stolen.

Figure 6A:
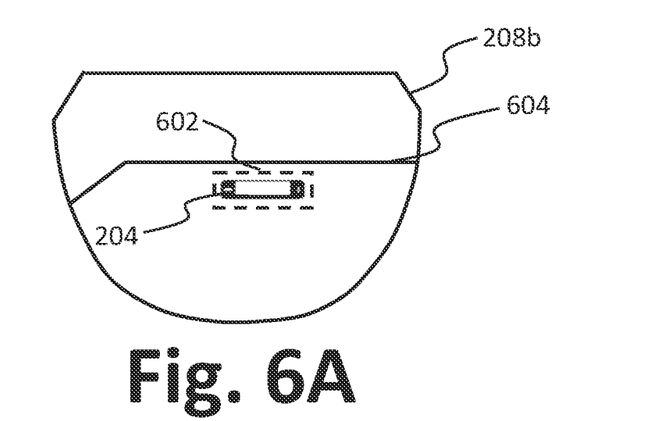
FIGS. 6A-6C show an example of an alert being output by the AR system of FIG. 2.
Figure 6B:
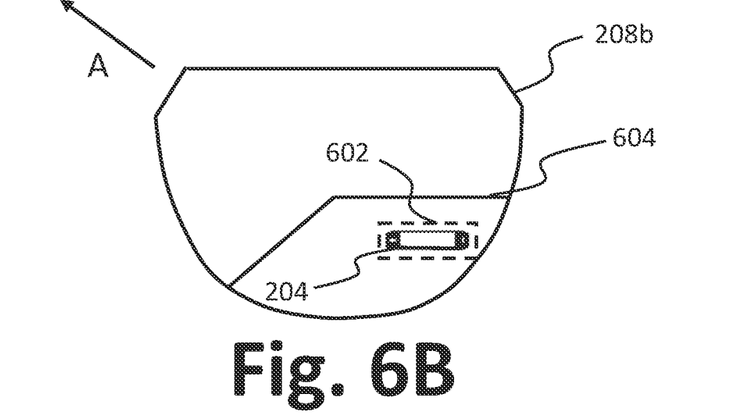
Figure 6C:
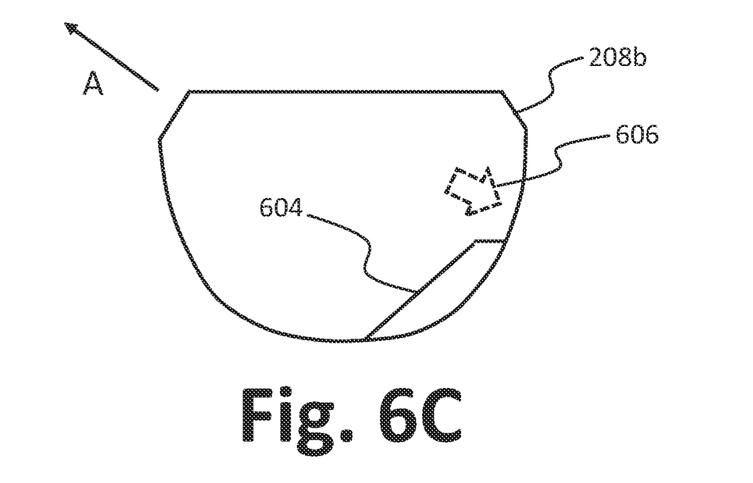

FIGS. 6A-6C show an example in which an alert is generated for a user of the AR system 200. In FIG. 6A, the AR system 200 has identified the user's smartphone 203 on a table 604. In this example, a bounding box 602 is displayed on the lens 208b to indicate to the user that the AR system 200 has identified the smartphone 203. The stored object location data is updated to indicate the location of the smartphone 203 on the table 604. In FIG. 6B, the user has started to move in a direction indicated by the arrow A. In FIG. 6C, the user has continued to move in the direction indicated by the arrow A, such that the smartphone 203 is no longer in the field of view of the cameras 212a, 212b. In this example, the AR system 200 detects a separation of the user from the smartphone 203 when the location of the smartphone 203, as indicated by the object location data, moves from inside the field of view of the cameras 212a, 212b to outside the field of view of the cameras 212a, 212b. The AR system 200 therefore generates and displays an alert on the lens 208b in the form of an arrow 606 pointing towards the location of the smartphone 203 indicated by the object location data.

Figure 7:
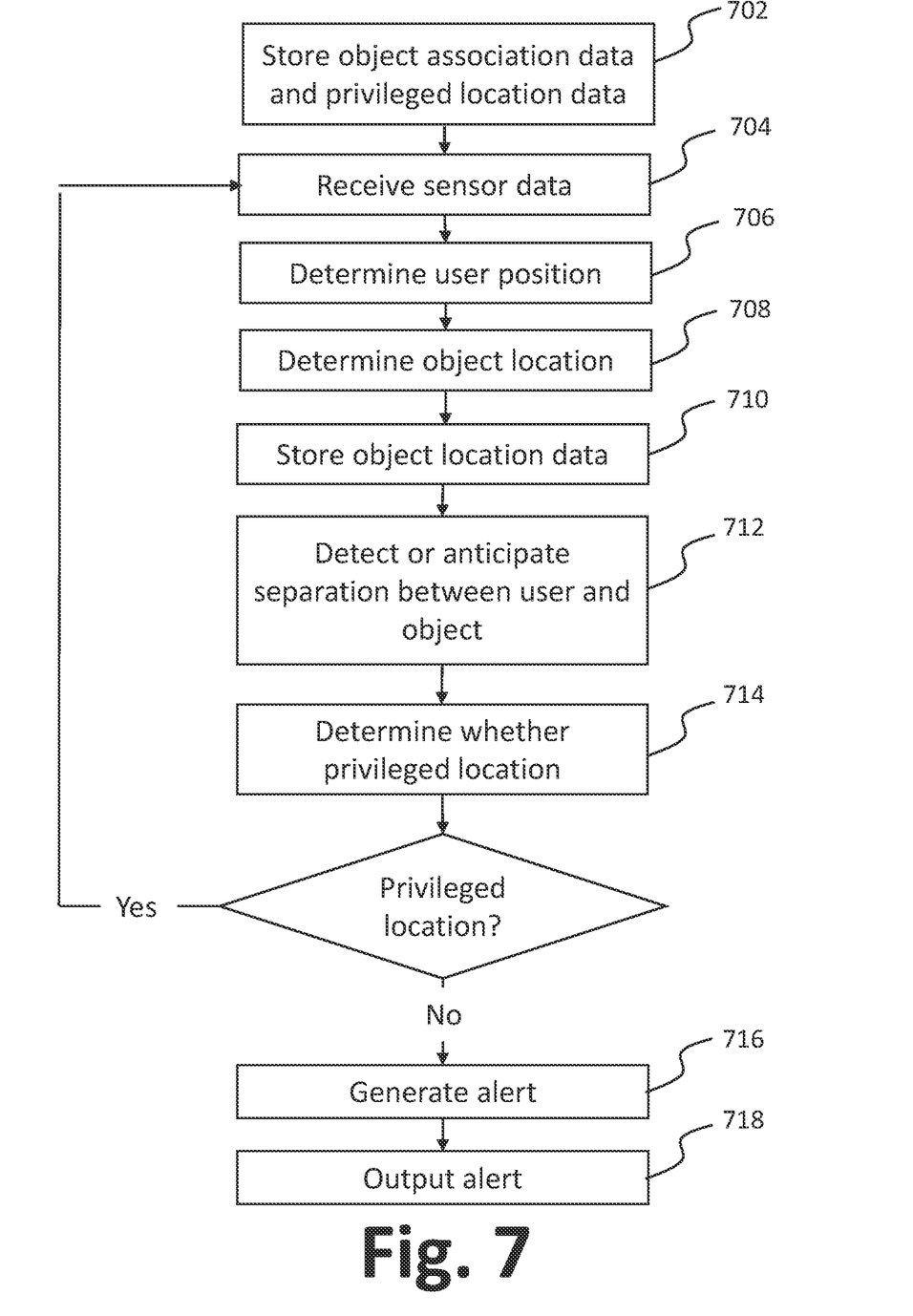
FIG. 7 is a flow diagram showing a further computer-implemented method of generating an alert for outputting via a user interface of an AR system in accordance with examples.

FIG. 7 shows a further method performed by the AR system 200 (or any other suitable embodiment of the AR system 100). The operations 702-712 of FIG. 7 are identical to the operations 502-512 of FIG. 5, with the exception that, at 702, the AR system 200 further stores privileged location data indicative of one or more privileged locations. The privileged locations may include, for example, the user's home and/or the user's place of work. In this example, the user can enter privileged locations via the app on the smartphone 202, either by manually entering details of the location or by indicating that the user is currently located at a privileged location. In other examples, an AR system may automatically identify a location as a user's home, for example by analysing the location of the user over a prolonged period of time. In this example, privileged location data indicates a precise set of co-ordinates for each privileged location, though in other examples privileged location data may include additional information, for example a layout of a home or other premises, generated using SLAM.

Having detected or anticipated, at 712, a separation between the user and one of the objects indicated in the object association data, the AR system 200 determines, at 714, whether the location of the object indicated by the object location data corresponds to any of the one or more privileged locations. In the present example, the location of the object is determined to correspond to the privileged location if the location of the object is less than a threshold distance from the indicated co-ordinates of the privileged location. In other examples, for example where the privileged location includes a layout of a home or other premises, an AR system can determine accurately whether the location of an object is within the premises and therefore corresponds to the privileged location.

In the present example, if the AR system 200 determines that the location of the object corresponds to a privileged location, the AR system 200 takes no further action in regard to the detected or anticipated separation of the object from the user. In particular, the AR system 200 is prevented from alerting the user if the object is left at the privileged location. For example, a user may choose to leave one or more objects at home, in which case it would not be desirable for the AR system 200 to alert the user when the user leaves the home. Even if the user accidentally leaves an object at home, this is likely to cause less inconvenience and/or cost than accidentally leaving an object elsewhere. If the AR system 200 determines that the object is not located at a privileged location, the AR system generates and outputs, at 716 and 718, an alert as described at 514 and 516 in FIG. 5.

Although in the example of FIG. 7 the AR system 200 is arranged to generate an alert upon determining that the object is not located in a privileged location, the AR system 200 may instead be configured to generate an alert upon determining that an object is located in a privileged location. Furthermore, different privileged locations may be applicable to different objects. For example, a user may wish to be notified if the user leaves home without an object belonging to a specified set of objects (for example, a set of keys or a smartphone), but may not wish to be notified if the user leaves home without an object not belonging to the specified set of objects.

Figure 8:
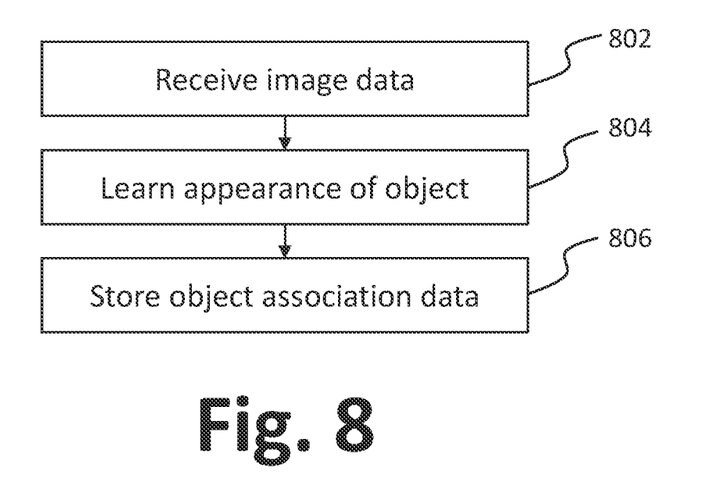
FIG. 8 is a flow diagram showing a computer-implemented method of generating data associating a user of an AR device with an object in an environment in accordance with examples.

FIG. 8 shows an example of a method performed by the AR system 200 (or any other suitable embodiment of the AR system 100) to store object association data associating the user of the AR system 200 with a new item not previously known to the AR system 200. The AR system 200 receives, at 802, image data generated by the cameras 212a, 212b. In this example, the app on the smartphone 203 prompts the user to hold the new object in the field of view of the cameras 212a, 212b, at different orientations, such that the cameras 212a, 212b capture images of the object at various different orientations.

The AR system 200 learns, at 804, an appearance of the object. In this example, the AR system 200 processes the images of the object at different orientations to train a classifier using supervised learning, with the images of the object at different orientations used as training data. The AR system 200 thereby learns to identify the object from various angles, and is therefore able to recognise the object when the object appears in subsequent images. In this example, the AR system 200 associates a unique identifier with the object, and the AR system 200 is trained to determine, upon detecting the object in an image, co-ordinates of a bounding box containing the object, in addition to the unique identifier. In this example the AR system 200 is pre-trained to identify certain generic classes of object, for example "smartphone" or "keys". This allows the AR system 200 to efficiently detect objects of the generic class, reducing the difficulty of training the AR system 200 to learn the appearance of a particular object. This principle is referred to as transfer learning.

Having learned the appearance of the object, the AR system 200 stores, at 806, object association data indicating an association between the user and the object. The object association data in this example includes the unique identifier for the object, an icon or image representing the object, and optionally a name for the object.

In the example of FIG. 8, the AR system 200 learns the appearance of an object after prompting the user to hold the object in view of the cameras 212a, 212b. In other examples, an AR system can automatically generate object association data, for example where the AR system detects a particular object frequently appearing in the user's home or another privileged location. In other examples, a user may place a unique AR tag or marker on the object, which an AR system can be trained to detect. In still further examples, an AR system may learn other characteristics of an object, for example an identity of the connected device obtained during a wireless pairing process. The object association may then include the identity of the device as an alternative to, or in addition to, an appearance of the device. The AR system can then identify the device based on a wireless signal transmitted by the device.

The above embodiments are to be understood as illustrative examples. Further embodiments are envisaged. For example, an AR system may be trained to recognise certain people other than the user of the AR system (for example, members of the user's family or the user's friends). The AR system may identify one of the recognised people picking up an object, and store object location data indicating that the object is in the possession of that person. Furthermore, if the AR system identifies a person other than the user picking up the object, the AR system determines whether the user is one of the recognised people. If the person is recognised, the AR system performs no further action. If the person is not recognised, the AR system an alert to indicate that the person may be stealing the object. The AR system may also be configured to capture and store an image of the person who may be stealing the object, for subsequent use in identifying the person. Additionally, or alternatively, the generating of the alert could be dependent on whether the person picks up the object in a privileged location. For example, the AR system may perform no further action if the AR system identifies the object being picked up by another person in the user's home. An AR system with a wide field of view, for example completely surrounding the user, is particularly suitable for such applications.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. An augmented reality, AR, system comprising:
a user interface;
one or more sensors arranged to generate sensor data representing part of an environment in which a user of the AR system is located; and a memory arranged to store object association data associating the user with one or more objects in the environment, wherein the AR system is arranged to:
- determine a position of the user;
- determine, in dependence on the generated sensor data and the determined position of the user, a location of one of the one or more objects;
- store, in the memory, object location data to indicate the determined location of said one of the one or more objects;
- detect or anticipate, in dependence on the object location data, a separation of said one of the one or more objects from the user;
- generate an alert in dependence on the detected or anticipated separation of said one of the one or more objects from the user; and
- output, via the user interface, the alert and information depending on the determined location of said one of the one or more objects, wherein:
  - the memory is further arranged to store privileged location data indicating one or more privileged locations; and
  - the generating of the alert is dependent on whether the updated location of the object corresponds to any of the one or more privileged locations.

2. The AR system of claim 1, wherein:
the sensor data comprises image data; and
the determining of the updated location of said one of the one or more objects comprises processing the image data to detect said one of the one or more objects.

3. The AR system of claim 1, wherein:
determining the updated location of said one of the one or more objects comprises determining whether the user is currently in possession of said one of the one or more objects; and
the updated object location data indicates whether the user is currently in possession of said one of the one or more objects.

4. The AR system of claim 1, arranged to detect or anticipate, using the determined position of the user, the user leaving one of the one or more privileged locations,
wherein the generating of the alert is dependent on the detection or anticipation of the user leaving said one of the one or more privileged locations.

5. The AR system of claim 1, arranged to detect, using the generated sensor data, a picking up of said one of the one or more objects by a person other than the user,
wherein the detecting or anticipating of the separation of said one of the one or more objects from the user is in dependence on the detected picking up of said one of the one or more objects by the person other than the user.

6. The AR system of claim 5, arranged to capture, upon detecting the picking up of said one of the one or more objects by the person other than the user, an image of the person other than the user.

7. The AR system of claim 1, wherein the alert comprises information indicative of the updated location of said one of the one or more objects.

8. The AR system of claim 1, wherein the outputting of the information via the user interface is in response to a request from the user.

9. The AR system of claim 8, wherein the request from the user is derived using at least one of voice recognition and gesture recognition.

10. The AR system of claim 1, arranged to update the stored object association data, in dependence on further sensor data generated by the one or more sensors, to associate the user with a further object in the environment.

11. The AR system of claim 10, wherein:
the further sensor data comprises further image data; and
the updating of the stored object association data comprises processing the further image data to learn an appearance of the further object.

12. The AR system of claim 10, wherein the updating of the object association data is dependent on input from the user.

13. The AR system of claim 12, wherein the input from the user is derived using at least one of voice recognition and gesture recognition.

14. The AR system of claim 1, arranged to determine the position of the user using simultaneous localisation and mapping, SLAM.

15. The AR system of claim 1, wherein the user interface comprises one or more displays, wherein the AR system is arranged to output the information visually on the one or more displays.

16. The AR system of claim 1, wherein:
said one of the one or more objects is a device arranged to transmit a wireless signal; and
the AR system is arranged to identify said one of the one or more objects using the transmitted wireless signal.

17. A computer-implemented method comprising:
- storing object association data associating one or more objects in an environment with a user of an AR system;
- receiving sensor data representing part of the environment in which the user is located;
- determining a position of the user;
- determining, in dependence on the received sensor data and the determined position of the user, a location of one of the one or more objects associated with the user;
- storing object location data indicating the determined location of said one of the one or more objects;
- detecting, using the sensor data, a picking up of said one of the one or more objects by a person other than the user;
- detecting or anticipating, in dependence on the stored object location data and the detected picking up of said one of the one or more objects by the person other than the user, a separation of said one of the one or more objects from the user;
- generating an alert in dependence on the detected or anticipated separation of said one of the one or more objects from the user; and
- outputting, via a user interface of the AR system, the alert and information depending on the determined location of said one of the one or more objects.

18. A non-transient storage medium comprising machine-readable instructions which, when executed by a computing system, cause the computing system to:
- store object association data associating one or more objects in an environment with a user of an AR system;
- receive sensor data generated by one or more sensors and representing part of the environment in which the user is located;
- determine a position of the user;
- determine, in dependence on the received sensor data and the determined position of the user, a location of one of the one or more objects associated with the user;
- store object location data indicating the determined location of said one of the one or more objects;

output, via a user interface of the AR system, information depending on the determined location of said one of the one or more objects;
receive further sensor data generated by the one or more sensors; and
update the stored object association data, in dependence on the further sensor data, to associate the user with a further object in the environment.

\* \* \* \* \*